United States Patent [19]

Reilly, III

[11] Patent Number: 5,611,411
[45] Date of Patent: Mar. 18, 1997

[54] TURBINE LUBRICATION OIL FILTRATION SAFEGUARD SYSTEM

[75] Inventor: William P. Reilly, III, Dunnellon, Fla.

[73] Assignee: Florida Power Corporation, St. Petersburg, Fla.

[21] Appl. No.: 644,345

[22] Filed: May 10, 1996

[51] Int. Cl.[6] ................................................ F01M 1/18
[52] U.S. Cl. ...................... 184/6.4; 184/6.24; 184/6.11
[58] Field of Search ................................ 184/6.4, 6.24, 184/6, 6.11

[56] References Cited

U.S. PATENT DOCUMENTS

| | | |
|---|---|---|
| 1,658,362 | 2/1928 | Walker . |
| 2,430,097 | 11/1947 | Bauer . |
| 2,613,498 | 10/1952 | Prendergast . |
| 3,563,344 | 2/1971 | Veller et al. ................................ 184/6 |
| 3,625,308 | 12/1971 | Gebel ........................................ 184/6.1 |
| 3,712,420 | 1/1973 | Pelizzoni et al. ...................... 184/103.1 |
| 3,782,501 | 1/1974 | Pagella ..................................... 184/6.4 |
| 4,002,224 | 1/1977 | Easter . |
| 4,105,092 | 8/1978 | Zeidler et al. ............................ 184/6.4 |
| 4,105,093 | 8/1978 | Dickinson . |
| 4,258,679 | 3/1981 | Leitermann .......................... 184/104.1 |
| 4,509,659 | 4/1985 | Cloutier et al. .......................... 184/7.4 |
| 4,648,363 | 3/1987 | Kromich . |
| 4,721,185 | 1/1988 | Weigle . |
| 4,898,262 | 2/1990 | Gorodissky et al. ..................... 184/6.4 |
| 4,899,850 | 2/1990 | Koller et al. . |
| 5,320,196 | 6/1994 | Mouton . |
| 5,505,112 | 4/1996 | Gee ....................................... 184/6.14 |

FOREIGN PATENT DOCUMENTS 1160072  6/1985  U.S.S.R. ................................ 184/6.4

*Primary Examiner*—Thomas E. Denion
*Attorney, Agent, or Firm*—Larson & Larson, P.A.; James E. Larson

[57] ABSTRACT

A lubrication system for a turbine generator includes a sump having a first chamber that receives oil from the turbine generator and a second chamber from which filtered lubrication oil is supplied to the turbine generator. The chambers are interconnected by a partition wall having a flapper valve in the wall allowing unfiltered oil to bypass the filtration loop should a malfunction occur in a pump that pumps oil through the filtration loop. The flapper valve allows unfiltered oil to travel directly from the first chamber to the second chamber and thence to be pumped through the turbine generator by one or more pumps contained within the second chamber.

9 Claims, 2 Drawing Sheets

TURBINE LUBRICATION OIL FILTRATION SAFEGUARD SYSTEM

BACKGROUND OF THE INVENTION

The present invention relates to a turbine lubrication oil filtration safeguard system. As is known, it is imperative that a turbine generator always be provided with an ample supply of clean filtered lubrication oil so as to maintain smooth, trouble-free operation. Customarily, lubrication oil returned to a sump is filtered and then re-supplied to the turbine generator for further lubrication. It is important to separate unfiltered return oil received from the turbine generator from oil to be supplied to the turbine generator so that the turbine generator is always supplied with clean oil. However, in such a system, if return oil from the turbine generator is prevented from being returned to the turbine generator due to, for example, malfunction of a pump within the oil filtration loop, in short order, the turbine generator will either be damaged or destroyed. As such, a need has developed to provide a turbine generator with a lubrication system that places a priority upon returning filtered oil to the turbine generator but, at the same time, precludes a situation wherein no oil is supplied to the turbine generator.

The following prior art is known to Applicant:

U.S. Pat. No. 1,658,362 to Walker
U.S. Pat. No. 2,430,097 to Bauer
U.S. Pat. No. 2,613,498 to Prendergast
U.S. Pat. No. 4,002,224 to Easter
U.S. Pat. No. 4,105,093 to Dickinson
U.S. Pat. No. 4,648,363 to Kronich
U.S. Pat. No. 4,721,185 to Weigle
U.S. Pat. No. 4,899,850 to Koller et al.
U.S. Pat. No. 5,320,196 to Mouton.

Walker describes a process for purifying oil having a series of settling tanks and a centrifuge to remove excess particles from the oil.

Bauer describes a lube oil filtration system wherein oil is passed through a clarifying unit and returned to the supply conduit at a point intermediate to the point of withdrawal and the parts to be lubricated. The oil is passed through the clarifier and returned to the supply conduit at a rate greater than the rate of flow from the reservoir to the parts to be lubricated. However, Bauer does not disclose a flapper valve.

Prendergast describes a separation and reclaiming cycle for oil going to a gas turbine.

Easter describes a turbine lubrication system in which oil is returned from bearings and drained to a non-pressurized oil collection chamber which supplies the suction for the main oil pump. There is an emergency pressurized gas system including a gas cylinder connected to the chamber to ensure independent oil flow in the event of interruption of pump power.

Dickinson describes a system for controlling lubricant pressure in a gas storage reservoir. A pressurized gas storage reservoir is maintained at a pressure, under normal operating conditions, less than the pressure in the pressurized reservoir. If there is a malfunction so that the pressure in the pressurized reservoir is less than the pressure in the gas storage reservoir, lubricant is supplied to bearings for a predetermined time.

Kronich describes a lubricating oil filtration system and oil filtering system having an independent flow circuit separate from the engine lubrication system. A screw type oil pump is rotatably mounted on the support shaft of the engine governor. An oil pump is provided for use with the separate full flow oil filtration system. The oil sump has a single chamber.

Weigle describes a system with an oil container arrangement for vehicles. An additional container is arranged in an oil accommodating apparatus so that a hydraulic pump continues to aspirate filtered oil from the additional container to supply hydraulic oil to the system.

Koller et al. describe a lubricating system for a turbomachine, a central rotor shaft with a main oil pump being mechanically connected to the central rotor shaft with a suction discharge line connecting the suction line to the oil container and providing for the balancing of the leakage losses and for removal of the heat fed to the oil by an occurring friction load output.

Mouton describes a pressure system for detecting malfunction of a fuel oil heat exchanger.

The present invention differs from the teachings of these patents as contemplating a sump having two chambers which may communicate with one another via a flapper valve to ensure delivery of lubricant to the turbine generator even if there is a malfunction in the pump in the filtration circuit.

SUMMARY OF THE INVENTION

The present invention relates to a turbine lubrication oil filtration safeguard system. The present invention includes the following interrelated objects, aspects and features:

(1) In a first aspect, the present invention is specifically directed to the sump of a turbine generator lubrication system. In particular, the turbine generator is provided with lubrication oil passageways supplied with lubricant to maintain the various moving parts of the turbine generator lubricated to avoid metal-to-metal contact between relatively moving surfaces so as to lengthen the life of the turbine generator. Accordingly, the turbine generator has a supply port receiving lubricant and an exhaust port conveying lubricant back to the sump.

(2) The sump includes a first chamber and a second chamber. The first chamber receives used lubricating oil from the exhaust port. The second chamber supplies oil to the supply port of the turbine generator. The first and second chambers are separated by a partition wall having a flapper valve therein at the lower end thereof.

(3) An outlet port is provided in a wall of the first chamber and is fluidly connected to a first pump which pumps lubricating oil within the first chamber through a filter and thence to an inlet port located in a side wall of the second chamber. Within the second chamber, in the preferred embodiment, multiple pumps are provided which operate in a parallel circuit concurrently supplying filtered lubricating oil to the supply port of the turbine generator lubricating system.

(4) In the preferred embodiment, the flow capacity of the first pump exceeds the combined flow capacities of the multiple pumps in the second chamber by at least a slight amount. In this way, the second chamber is always supplied, from the filter, with an ample supply of filtered lubricating oil so that oil supply to the supply port of the lubricating system of the turbine generator is clean. If, for any reason, there is a malfunction in the first pump or, if, for example, the filter becomes clogged to reduce flow to the inlet port of the second chamber, and if such condition results in reduction of the level of lubricating oil within the second chamber to a level below that of the first chamber, the flapper valve will open permitting lubricating oil to flow directly from the first chamber to the second chamber bypassing the first pump and filter.

(5) In another aspect, during normal operation, given the higher flow capacity of the first pump as compared to the combination of the multiple pumps in the second chamber, the level of lubricating oil within the second chamber will usually exceed that of the first chamber. Under such conditions, the flapper valve will open in the direction of the first chamber to allow recirculation of lubricating oil from the second chamber back to the first chamber where the lubricating oil will be conveyed back to the second chamber via the first pump and filter.

Accordingly, it is a first object of the present invention to provide a turbine lubrication oil filtration safeguard system.

It is a further object of the present invention to provide such a system with a sump having two chambers separated by a partition wall having a two-way flapper valve therein.

It is a yet further object of the present invention to provide such a system wherein a pump supplying lubricating oil from a first chamber to a second chamber has a greater capacity than the combination of pumps contained within the second chamber.

It is a still further object of the present invention to provide such a system wherein multiple pumps are provided in a second chamber which run in parallel with one another to provide redundancy.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
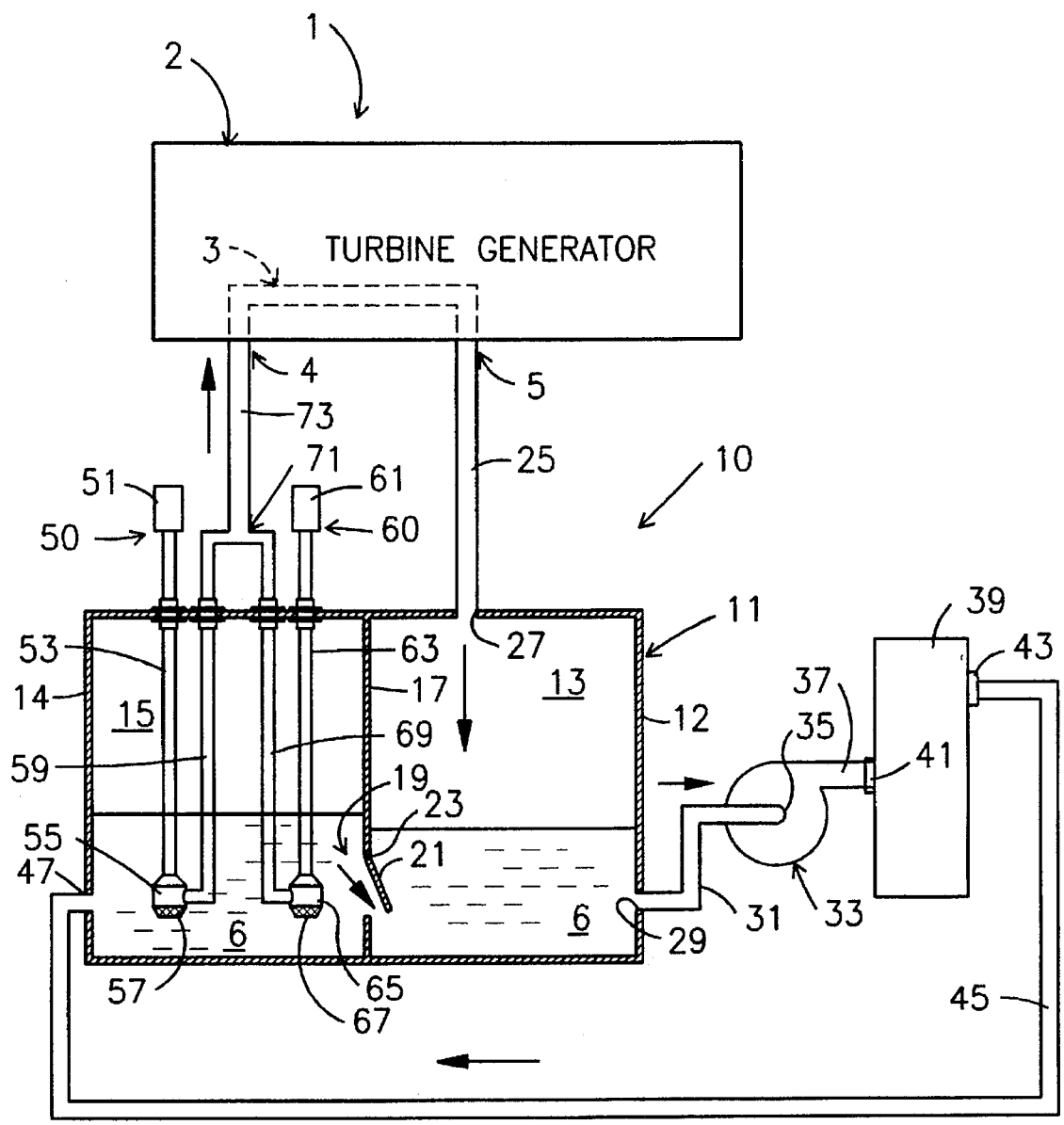
FIG. 1 shows a schematic representation of the inventive system in one mode of operation.
Figure 2:
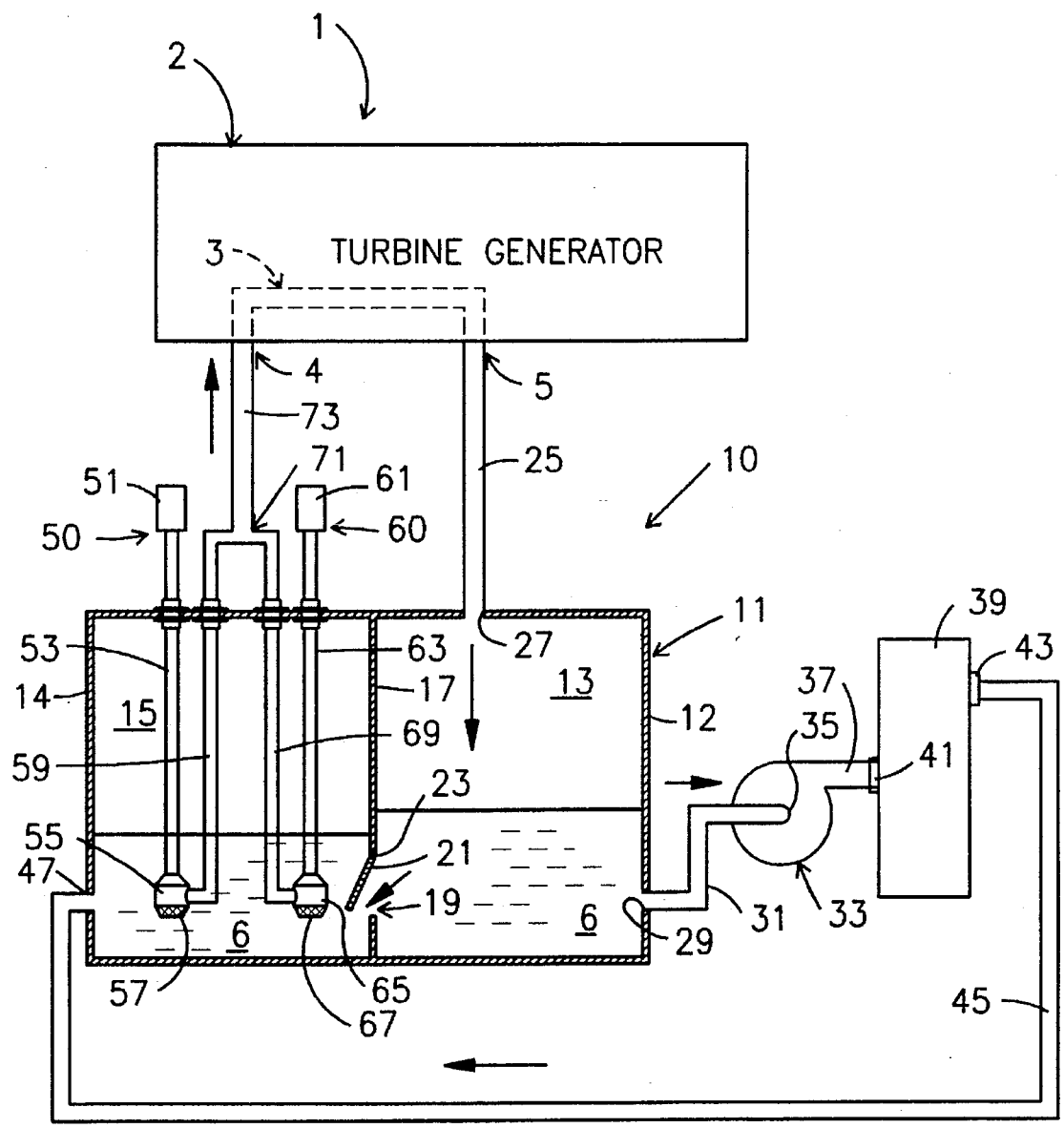
FIG. 2 shows a schematic representation of the inventive system in a second mode of operation.

With reference to FIGS. 1 and 2, a turbine generator is generally designated by the reference numeral 1 and includes a turbine (not shown) that rotates to provide power in a manner well known to those skilled in the art. The turbine generator has a housing 2 that includes a lubricating system shown in phantom and designated by the reference numeral 3 and including a supply port 4 to supply lubricating oil to the lubricating system 3 and an exhaust port 5 for exhausting used lubricating oil from the lubricating system 3.

The present invention is generally designated by the reference numeral 10 and is seen to include a sump 11 having a first chamber 13 and a second chamber 15, which chambers are defined, in part, by a partition wall 17 having an opening 19 closeable by a flapper valve 21 hingedly connected to the wall 17 at the pivot 23. The flapper valve 21 may pivot in either direction with respect to the partition wall 17 as best seen from comparison of FIGS. 1 and 2.

With reference to the figures, lubricating oil exhausted from the lubricating system 3 via the exhaust port 5 travels through a passageway 25 and enters the first chamber 13 of the sump 11 via the inlet port 27. Oil 6 shown within the first chamber 13 leaves the first chamber 13 via an outlet port 29 located near the bottom of the side wall 12 of the sump 11. A passageway 31 connects the outlet port 29 with the inlet port 35 of pump 33 that also has an outlet port 37 interconnected with the inlet 41 of the filter 39. The filter 39 has an outlet 43 that outputs filtered lubricating oil to the passageway 45 which supplies the further inlet port 47 located at the lower end of the side wall 14 of the sump 11 to supply filtered lubricating oil to the second chamber 15 of the sump 11.

Associated with the second chamber 15 are multiple pumps. Up to five or more pumps may be employed. For illustration purposes, only 50 and 60 are depicted in FIGS. 1 and 2. The pump 50 includes a motor 51 outside the chamber 15 that turns a drive shaft (not shown) within the tube 53 to drive an impeller (not shown) within the housing 55 that also carries an inlet strainer 57 to provide further filtration of lubricating oil 6. Oil 6 flowing past the strainer 57 is pumped by the impeller (not shown) into the outlet passageway 59. Correspondingly, the pump 60 includes a motor 61 outside the chamber 15 that drives a drive shaft (not shown) within the tube 63 to drive an impeller (not shown) within the housing 65 that also carries the inlet strainer 67. Oil 6 is pumped by the impeller (not shown) through the strainer 67 and via the impeller (not shown) into the outlet passageway 69.

The passageways 59 and 69 are parallel passageways interconnecting at a Tee fitting 71 combining the passageways 59 and 69 into a single passageway 73 that supplies the supply port 4 of the lubricating system 3 of the turbine generator 1. If desired, reverse flow preventing check valves (not shown) may be included in the passageways 59 and 69 to preclude reverse flow back to the chamber 15.

With the present invention having been described in detail, the preferred mode of operation will now be explained. Looking first at FIG. 1, lubricating oil exhausting from the lubricating system 3 of the turbine generator 1 via the exhaust port 5 flows through the passageway 25 and enters the chamber 13 of the sump 11 via the port 27. With the pump 33 operating, oil 6 flows from the first chamber 13 via the port 29 and flows through the pump 33 and thence through the filter 39 to be filtered to remove solids, other particulates, and other contaminants therefrom. Filtered lubricating oil flows through the passageway 45 and enters the second chamber 15 of the sump 11 via the port 47. With the pumps 50 and 60 operating, oil 6 within the second chamber 15 flows through the strainers 57, 67 and is pumped through the passageways 59 and 69 that combine at the Tee 71 and is pumped through the passageway 73 to the supply port 4 of the lubricating system 3.

In the preferred embodiment, the flow capacity of the pump 33 is designed to exceed the combined flow capacities of the pumps 50 and 60. In a typical 9,000 to 10,000 gallon sump 11 a pump 33 having a capacity of 1500 gallons per minute with a 500 megawatt unit is satisfactory. As such, the level of oil 6 within the first chamber 13 is usually lower than the level of lubricating oil 6 within the second chamber 15. Under such circumstances, as shown in FIG. 1, the flapper valve 21 pivots in the right-hand direction in the view of FIG. 1 due to the increased head of the oil 6 within the chamber 15 to thereby tend to cause a flow of oil in the direction from the chamber 15 toward the chamber 13 as the oil seeks its own level. Thus, a flow path is created which includes the port 29, conduit 31, pump 33, filter 39, passageway 45, port 47, chamber 15 and, via flapper valve 21 and port 19, back to the first chamber 13. At the same time, the pumps 50 and 60 are operating to cause lubricating oil to be circulated through the lubricating system 3.

The flapper valve 21 can be made of aluminum and will be about three feet by three feet square.

With reference to FIG. 2, if for any reason there is a malfunction in the circuit including the pump 33 and the filter 39 such as, for example, failure of the pump 33 or clogging of the filter 39, and should flow through the port 47 be reduced below the flow capacity of the combination of the pumps 50 and 60, the level of oil within the chamber 15 will become lower than the level of oil in the chamber 13 as shown in FIG. 2. Under such circumstances, with reference to FIG. 2, the flapper valve 21 will pivot in the direction of the second chamber 15 allowing oil 6 within the chamber 13 to flow into the chamber 15 directly without flowing through the pump 33 and filter 39 thereby maintaining the level of oil 6 within the chamber 15 above the strainers 57 and 67 so that continuous lubricant supply to the lubricating system 3 may be had.

If desired, the pivot 23 of the flapper valve 21 may allow free swinging of the flapper valve 21. Under such circumstances, the flapper valve 21 will automatically move to be located within the chamber 13 or 15 having the lower head.

The flapper valve 21 may be made of any suitable materials so long as they are able to withstand being continually immersed in lubricating oil having impurities therein generated through use as a lubricant.

As such, an invention has been disclosed in terms of a preferred embodiment thereof which fulfills each and every one of the objects of the invention as set forth hereinabove and provides a new and useful turbine lubrication oil filtration safeguard system of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. In a lubrication system for supplying lubricant to a turbine generator, the improvement comprising:

a) a sump having a first chamber and a second chamber;

b) a first inlet port in said first chamber receiving lubricant from said generator;

c) a first outlet port in said first chamber supplying lubricant to a second inlet port in said second chamber via a filter;

d) said first and second chambers being separated by a partition wall having an opening therethrough; and e) a two-way valve in said opening that senses differential pressure based upon differences in respective levels of lubricant in said first and second chambers and opens in a direction causing flow of lubricant in a direction from a chamber having a higher level of lubricant into a chamber having a lower level of lubricant.

2. The system of claim 1, further including a pump between said first outlet port and said second inlet port.

3. The system of claim 2, wherein said pump comprises a first pump, and further including multiple pumps in said second chamber that pumps lubricant to said turbine generator.

4. The system of claim 3, wherein said multiple pumps comprise pumps arranged in parallel.

5. The system of claim 3, wherein said first pump has a flow capacity higher than that of said multiple pumps.

6. The system of claim 3, wherein said multiple pumps includes a motor located outside said second chamber.

7. The system of claim 3, wherein said second inlet port is at approximately equal level to an inlet of said multiple pumps.

8. The system of claim 2, wherein said filter is downstream of said pump.

9. A lubrication system for supplying lubricant to a machine, comprising:

a) a sump having a first chamber and a second chamber;

b) a first inlet port in said first chamber receiving lubricant from said machine;

c) a first outlet port in said first chamber supplying lubricant to a second inlet port in said second chamber via a filter;

d) said first and second chambers being separated by a partition wall having an opening therethrough;

e) a two-way valve in said opening that senses differential pressure based upon differences in respective levels of lubricant in said first and second chambers and opens in a direction causing flow of lubricant in a direction from a chamber having a higher level of lubricant into a chamber having a lower level of lubricant;

f) a first pump between said first outlet port and said second inlet port;

g) multiple pumps in said second chamber that pumps lubricant to said machine; and h) said first pump having a higher flow capacity than said multiple pump.

* * * * *